United States Patent [19]

Goodrich

[11] 4,450,983

[45] May 29, 1984

[54] POWDER DISPENSING ASSEMBLY

[75] Inventor: Michael J. Goodrich, Traverse City, Mich.

[73] Assignee: Kelsey-Hayes Company, Romulus, Mich.

[21] Appl. No.: 401,790

[22] Filed: Jul. 26, 1982

[51] Int. Cl.[3] .............................................. B65G 69/00

[52] U.S. Cl. .................................... 222/196; 222/200; 366/108

[58] Field of Search ............... 222/199, 200, 196, 161, 222/181, 185, 460; 366/108; 141/72, 74–79; 239/659

[56] References Cited

U.S. PATENT DOCUMENTS 3,934,762 1/1976 Arayama ............................ 222/200
4,298,168 11/1981 Rozmus .............................. 239/659
4,378,871 4/1983 Clark .................................. 222/196

*Primary Examiner*—Joseph J. Rolla
*Assistant Examiner*—Kenneth Noland
*Attorney, Agent, or Firm*—Harold W. Milton, Jr.

[57] ABSTRACT

A powder dispensing assembly (10) comprising; support structure (20), a dispensing platform (26) supported by the support structure (20) for receiving powder and having a distal lip (28) over which particles of powder move to define a falling curtain of powder particles. A supply platform (30) is supported by the support structure (20) for receiving powder and supplying the powder to the dispensing platform (26). A flow control device (34) establishes a flow path of the powder from the supply platform (30) to the dispensing platform (26). A drive device (36) vibrates the dispensing platform (26) to move particles thereover and over the lip (28) and to move the supply platform (30) in unison with the dispensing platform (26) to move powder from the supply platform (30) and through the flow control device (34) to the dispensing platform (26). A shelf (54) is disposed below the lip (28) for receiving the powder from the lip (28). The shelf (54) is stationary and extends downwardly to a distal edge (56) at an inclined angle sufficient for the powder to flow thereover under the force of gravity and over the edge (56).

20 Claims, 4 Drawing Figures

POWDER DISPENSING ASSEMBLY

BACKGROUND OF THE INVENTION (1) Field of the Invention

The powder dispensing assembly of the subject invention is utilized to dispense a curtain of falling powder particles at a controlled and precise rate. Although not limited thereto, the subject invention was developed and is particularly suitable for use in the processing of powdered metal particles. In the processing powdered metal particles the particles are frequently classified according to size. One manner in which this is accomplished is to establish a curtain of falling particles which fall into a horizontally moving stream of gas which establishes short trajectories for the heavier particles and long trajectories for the lighter particles so that the particles fall into classification compartments. The subject invention is particularly useful for dispensing such a curtain of falling powder particles.

(2) Description of the Prior Art

There are known in the prior art dispensing assemblies which dispense particles. Specifically, there are known in the prior art dispensing assemblies wherein a platform is supplied particles and vibrated to move the particles to an edge or lip over which they fall. There is a need for a dispensing assembly which dispenses a controlled amount of powder and in a substantially continuous and thin falling curtain of powder.

SUMMARY OF THE INVENTION

A powder dispensing assembly including a support structure with a dispensing platform supported by the support structure for receiving powder and having a distal lip over which particles of powder move to define a falling curtain of powder particles. A supply platform is supported by the support structure for receiving powder and supplying the powder to the dispensing platform. A flow control means establishes a flow path of the powder from the supply flatform to the dispensing platform. A drive means vibrates the dispensing platform to move particles thereover and over the lip and for moving the supply platform in unison with the dispensing platform to move powder from the supply platform and through the flow control means to the dispensing platform. A stationary shelf is disposed below the lip for receiving the powder and extends to a distal edge at an inclined angle sufficient for the powder to flow thereover under the force of gravity and over the distal edge. By utilizing a supply platform which is moved in unison with the vibration of the dispensing platform and flowing the powder over an inclined shelf, there is dispensed a precise and controlled amount of powder in a substantially continuous falling curtain.

PRIOR ART STATEMENT

There is included in the prior art a dispensing assembly for dispensing a controlled and precise amount of powder as described in U.S. Pat. No. 4,298,168 granted Nov. 3, 1981 and assigneed to the assignee of the subject invention. The subject invention is an improvement over that invention to, in addition to providing the precise and controlled flow of powder, convert a series of falling and separated groups of powder particles into a substantially continuous and thin falling curtain of powder.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
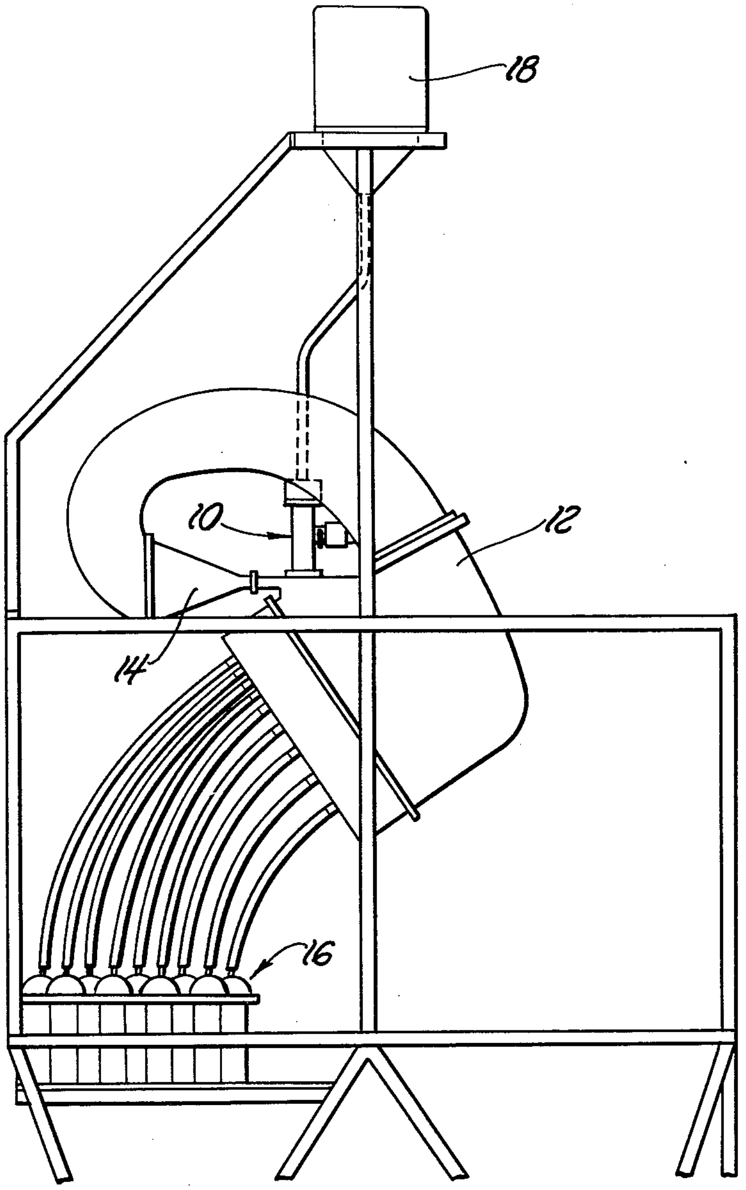
FIG. 1 is a fragmentary elevational view of a powder classifying assembly with which the dispensing assembly of the subject invention may be utilized.

A powder dispensing assembly constructed in accordance with the subject invention is generally shown at 10. As alluded to above, the powder dispensing assembly 10 is particularly suited for dispensing a curtain of falling powder metal particles into a horizontal flow of gas for classifying the particles by size and weight. An example of such a powder classification assembly is shown in FIG. 1 which incorporates the powder dispensing assembly 10 of the subject invention. The classifying apparatus shown in FIG. 1 includes a ductwork 12 through which a gas is circulated so as to pass through a nozzle 14 and engage a falling curtain of powder particles which are dispensed from the dispensing assembly 10. The particles are classified by size and weight into the various containers generally shown at 16. Initially, the powder particles to be classified are supplied from the contain 18 to a supply slot for supplying the dispensing assembly 10 as will be more clear hereinafter.

The powder dispensing assembly 10 includes a support structure defined by a rectangular housing generally indicated at 20. The housing 20 has parallel side walls and parallel end walls with upper 22 and lower 24 flanges extending about the periphery thereof for attachment to adjacent components, as is illustrated in FIG. 1. The assembly 10 includes a dispensing platform 26 supported by the housing 20 for receiving powder and has a distal lip or edge 28 over which particles of powder move to define a falling curtain of powder particles falling from the lip or edge 28. The falling curtain of powder from the lip 28 is shown in FIG. 3 wherein the curtain is defined by a series of separated groups of particles which occur as a result of successive vibrations, produced as hereinafter described.

There is also included a supply platform 30 supported by the support structure for receiving powder and supplying the powder to the dispensing platform 26. The housing 20 is adapted by the flange 22 to receive an elongated supply slot 32 for supplying powder to the supply platform 30.

There is also included flow control means defined by the chute generally indicated at 34 for establishing a flow path of the powder from the supply platform 30 to the dispensing platform 26.

Figure 3:
FIG. 3 is a view of separated groups of falling particles.

The assembly also includes drive means generally indicated at 36 for vibrating the dispensing platform 26 to move particles thereover and over the lip 28 thereof and for moving the supply platform in unison with the dispensing platform 26 to move the powder from the supply platform 30 and through the chute 34 to the dispensing platform 26, from which the powder falls as illustrated in FIG. 3.

The supply platform 30 is supported for rocking movement about a pivot axis defined by the axis of the support pins 38 at either end of chute 34. The dispensing platform 26 is supported for oscillation in an arc having its center on the pivot axis defined by the pins 38.

The chute 34 is elongated and has a funnel shape as viewed in cross section with opposite ends 40. The wide upper portion 42 which extends between the ends 40 has an upper extremity above the supply platform 30 with the sides thereof extending vertically downwardly and then tapered so as to converge toward one another to join the narrow lower portion having the parallel spaced front 44 and rear 46 walls. The lower portion defined by the front 44 and rear 46 walls define and opening 48. More specifically, the dispensing platform 26 is integral with the rear wall 46 and extends forwardly beneath the lower extremity of opening 48 defined by the front wall 44 to the distal end defining the lip or edge 28 which is spaced forwardly of the front wall 44. The dispensing platform 26 slopes upwardly from the bottom of the rear wall 46 to the lip 28 in relationship to the front and rear walls 46. In other words, as the front and rear walls 44 and 46 are vertical, the dispensing platform 26 is not horizontal but slopes upwardly from rear to front.

The ends 40 of the chute 34 are supported by the support structure defined by the housing 20 for oscillation about the pivot axis defined by the pins 38. Specifically, blocks 50 are welded or otherwise secured to the interior of the end walls 40 and the pins 38 extend therefrom through the end walls 40 to be supported in resilient bushings or bearing support members (not shown), which are, in turn, supported within cap assemblies which are welded or otherwise secured to the exterior surfaces of the end walls of the housing 20.

The upper surfaces of the blocks 50 are horizontal and the ends of the supply platform 30 are disposed thereon and secured thereto by the fasteners 52. Thus, the supply platform 30 is supported by the blocks 50 within the wide upper portion 42 of the chute 34 and between the ends 40 of the chute 34. The supply platform 30 has its side edges disposed vertically above the tapered converging walls of the wide upper portion 42 of the chute 34 and is disposed immediately above the pivot axis defined by the pins 38. The supply platform 30 is an elongated flat plate having a longitudinal center line which is substantially vertically aligned with the pivot axis of the pins 38 when in the neutral or horizontal position. The supply platform 30 is disposed above the dispensing platform 26 whereby powder particles fall from the supply platform 30 to engage the converging walls of the upper wide portion 42 to flow down between the front and rear walls 44 and 46 to the dispensing platform 26. The supply platform 30 is spaced closer to the pivot axis of the pivot pins 38 than the dispensing platform 26. Specifically, the supply platform 30 is spaced immediately above the pivot axis defined by the pins 38 and, in some instances, could be on the pivot axis of the pins 38. Thus, the housing 20, through the pins 38, supports the entire chute 34 and the platforms 30 and 26 for rotation about the pivot axis defined by the pins 38.

The supply slot 32 supplies powder to the platform 30 and the slot 32 has a width narrow enough that the angle of repose of the powder from the supply slot 32 is less than the width of the supply platform 30 so that the powder remains upon the supply platform 30 when the supply platform 30 remains horizontal, i.e., does not rock about the axis of the pins 38.

Figure 4:
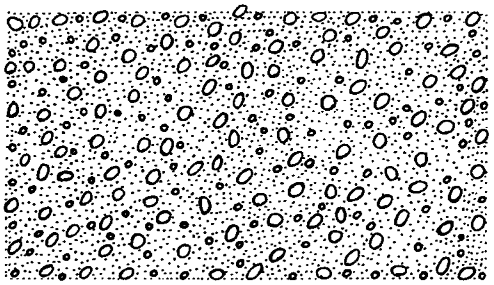
FIG. 4 is a view of a continuous falling curtain of particles produced by the assembly of the subject invention.
Figure 2:
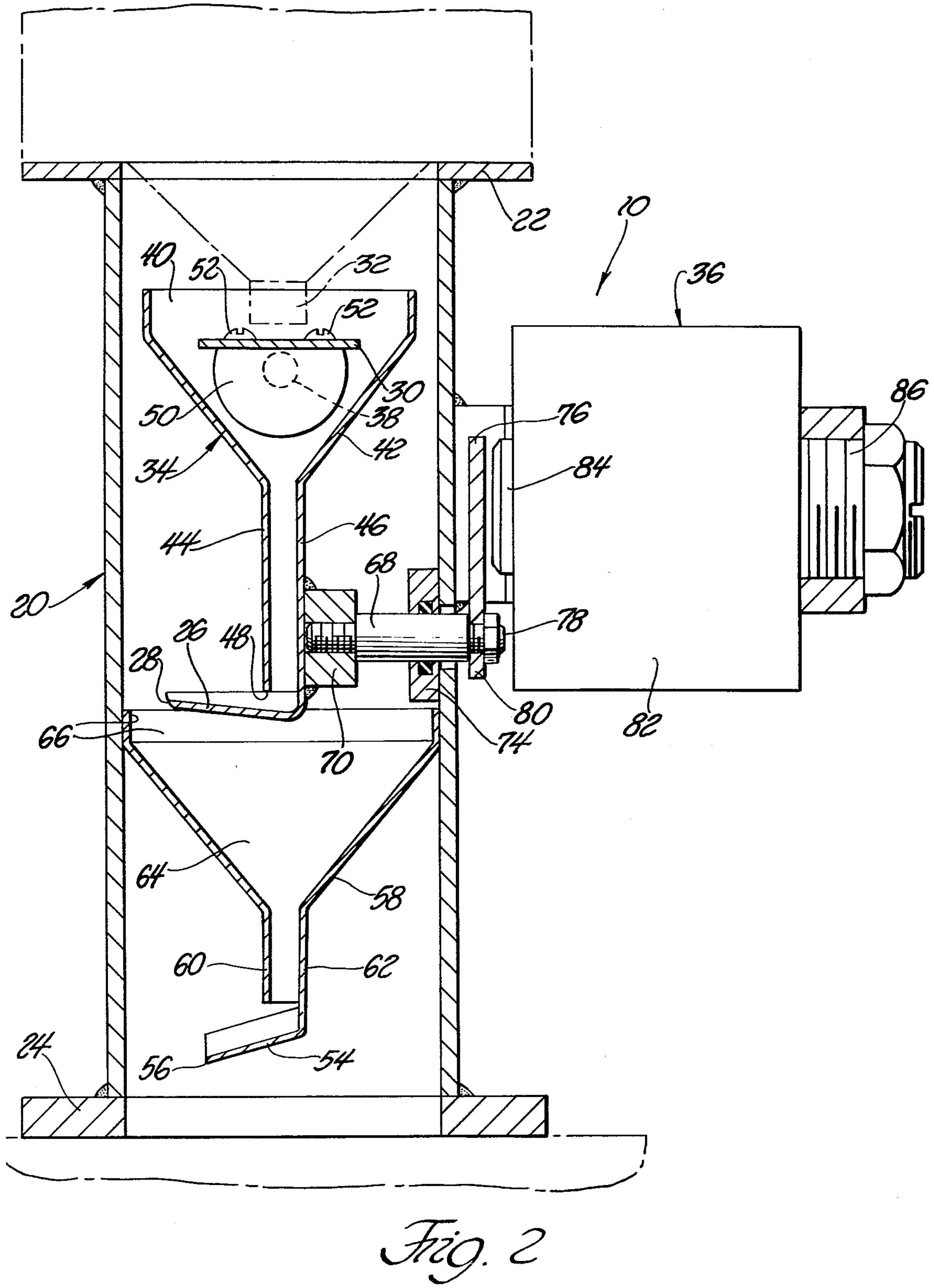
FIG. 2 is a cross-sectional view taken vertically through the mid-length of the assembly of the subject invention.

A shelf 54 is disposed below the lip 28 and receives the powder falling from the lip 28 as illustrated in FIG. 3. The shelf 54 is stationary relative to the chute 34 and extends to a distal edge 56 at an inclined angle downwardly relative to a horizontal plane. The inclination of the shelf 54 toward the distal edge 56 is sufficient for the powder to flow thereafter under the force of gravity and over the distal edge 56 to form the substanttially continuous and thin falling curtain of powder as illustrated in FIG. 4. The shelf 54 provides a vibration-free surface down which the powder rolls to smooth out the pulsed groups of particles shown in FIG. 3 into the uniform and continous curtain of powder shown in FIG. 4. The shelf 54 is integral with a feed trough 58 having a funnel-shaped cross section for receiving powder from the lip 28 and directing the powder flow onto the shelf 54. The feed trough includes spaced front 60 and rear 62 partitions and closed ends 64. The shelf 54 extends forwardly and downwardly beneath the lower extremity of the front partition 60 to the distal edge 56, the distal edge 56 being spaced outwardly from the front partition 60. The feed trough 58 has a large mouth 66 above the front 60 and rear 62 partitions for receiving powder from the lip 28. The trough 58 is supported by the large mouth 66 being attached and in sealing engagement with the interior walls of the housing 20.

The drive means 36 includes a rod or shaft 68 extending into and through the back wall of the housing 20 from the exterior thereof and is connected to the rear wall 46 of the chute 34 adjacent the lower extremity of the rear wall 46. More specifically, the shaft 68 is threaded into a member 70 which is, in turn, welded to the rear wall 46. The shaft 68 is in sealed engagement with the rear wall of the housing 20 by way of a bushing 74 which supports a seal and surrounds the shaft 58 on the interior of the rear wall of the housing 20.

The drive means 36 further includes a spring plate 76 which extends between opposite ends of the housing 20 on the exterior of the housing 20. The rod 58 has a threaded extension 78 which extends through a saddle portion 80 of the spring plate 76 and has a nut threaded thereon for connecting the spring plate 76 to the rod 68.

The drive means also includes an electromagnet 82 for moving the spring plate 66 to move the rod 58 to rotate the chute 34 about the pivot axis defined by the pins 38. The electromagnet 80 includes a coil wound about a central core 84 having an end spaced from the spring plate 76, i.e., there is a gap between spring plate 76 and the end of the core 84. The gap or the distance the core 84 is from the spring plate 76 may be adjusted by the cap and screw assembly 86. A more complete description and operation of these components is set forth in the aforementioned patent 4,298,168, which is incorporated herein by reference.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A powder dispensing assembly (10) comprising; support structure (20), a dispensing platform (26) supported by said support structure (20) for receiving powder and having a distal lip (28) over which particles of powder move to define a falling curtain of powder particles, a supply platform (30) supported by said support structure (20) for receiving powder and supplying the powder to said dispensing platform (26), flow control means (34) for establishing a flow path of the powder from said supply platform (30) to said dispensing platform (26), drive means (36) for vibrating said dispensing platform (26) to move particles thereover and over said lip (28) and for moving said supply platform (30) in unison with said dispensing platform (26) to move powder from said supply platform (30) and through said flow control means (34) to said dispensing platform (26), a shelf (54) disposed below said lip (28) for receiving the powder from said lip (28), said shelf (54) being stationary and extending downwardly to a distal edge (56) at an inclined angle sufficient for the powder to flow thereover under the force of gravity and over said edge (56), the shelf (54) provides a vibration-free surface by which pulsed groups of powder particles flowing towards the shelf (54) are smoothed out forming a uniform curtain of powder particles thereafter when the powder particles flow from the shelf (54).

2. An assembly as set forth in claim 1 including a feed trough (58) having a funnel-shaped cross section for receiving powder from said lip (28) and directing powder flow onto said shelf (54).

3. An assembly as set forth in claim 2 wherein said feed trough (58) includes spaced front (60) and rear (62) partitions and closed ends (64) and said shelf (54) is integral with said rear partition (62) and extending forwardly and downwardly beneath the lower extremity of said front partition (60) to said distal edge (56) which is spaced outwardly from said front partition (60).

4. An assembly as set forth in claim 3 wherein said feed trough (58) has a large mouth (66) above said front (60) and rear (62) partitions for receiving powder from said lip (28).

5. An assembly as set forth in claim 4 wherein said trough (58) is supported by said large mouth (66) being attached to said support structure (20).

6. An assembly as set forth in claim 5 wherein said supply platform (30) is supported for rocking movement about a pivot axis (38).

7. An assembly as set forth in claim 6 wherein said dispensing platform (26) is supported for oscillation in an arc having a center on said pivot axis (38).

8. An assembly as set forth in claim 7 wherein said supply platform (30) is spaced more closely to said pivot axis (38) than said dispensing platform (26).

9. An assembly as set forth in claim 8 wherein said supply platform (30) is disposed above said dispensing platform (26) whereby powder particles fall from said supply platform (30) to said dispensing platform (26).

10. An assembly as set forth in claim 9 wherein said flow control means (34) includes an elongated chute having a funnel shape as viewed in cross section and opposite ends (40) with the wide upper portion (42) disposed about said supply platform (30) and the narrow lower portion (44, 46) defining an opening (48) over said dispensing platform (26).

11. An assembly as set forth in claim 10 wherein said ends (40) of said chute (34) are supported by said support structure (20) for oscillation about said pivot axis (38), said supply platform (30) being supported within said wide upper portion (42) of said chute (34) between said ends (40) thereof.

12. An assembly as set forth in claim 11 wherein said supply platform (30) is disposed immediately above said pivot axis (38).

13. An assembly as set forth in claim 12 wherein said supply platform (30) comprises an elongated flat plate having a longitudinal center line substantially vertically aligned with said pivot axis (38) when in a neutral horizontal position.

14. An assembly as set forth in claim 13 wherein said lower portion of said chute includes spaced front (44) and rear (46) walls and said dispensing platform (26) is integral with said rear wall (46) and extends forwardly beneath the lower extremity (48) of said front wall (44) to said lip (28).

15. An assembly as set forth in claim 14 wherein said dispensing platform (26) slopes upwardly from said rear wall (46) to said lip (28) in relationship to said front (44) and rear (46) walls.

16. An assembly as set forth in claim 15 wherein said support structure (20) includes a housing supporting said trough and said chute (34) for rotation about said pivot axis (38).

17. An assembly as set forth in claim 16 wherein said housing (20) is adpated to receive a supply slot (32) for supplying powder to said supply platform (30) so that the angle of repose of the powder from the supply slot (32) is less than the width of said supply platform (30) whereby powder remains upon the supply platform (30) when the supply platform remains horizontal.

18. An assembly as set forth in claim 17 wherein said drive means (36) includes a rod (58) extending into said housing (30) from the exterior thereof and connected to said rear wall (46) of said chute (34) adjacent the lower extremity thereof.

19. An assembly as set forth in claim 18 wherein said drive means (36) further includes a spring plate (66) extending between opposite ends of said housing (20) on the extremity of said housing (20), said rod (58) being connected to said spring plate (66), an electromagnet (80) for moving said spring plate (66) to move said rod (58) to rotate said chute (34) about said pivot axis (38), a U-shaped bracket (72) attached exteriorly of said housing (20) at the ends thereof and attached to the ends of said spring plate (66), said U-shaped bracket (72) supporting said electromagnet (80).

20. An assembly as set forth in claim 19 wherein said housing (20) is made of nonmagnetic material and said bracket (72) and said spring plate (66) are made of magnetic material, sad electromagnet (80) being cyclically operable to establish a magnetic field for moving said spring plate (65) to move said dispensing platform (26) rearwardly so that said spring plate (66) returns to its unsprung condition between "on" cycles of said electromagnet (80).

* * * * *